3,282,989
PROCESS FOR PREPARING HALF ESTER ACYL CHLORIDES OF AROMATIC DICARBOXYLIC ACIDS
Gustav Renckhoff and Walter A. S. Rudolph, Witten (Ruhr), Germany, assignors to Chemische Werke Witten G.m.b.H., Witten (Ruhr), Germany
No Drawing. Filed Jan. 24, 1963, Ser. No. 254,044
Claims priority, application Germany, Feb. 2, 1962, C 26,151
9 Claims. (Cl. 260—475)

The present invention relates to the production of half ester acyl chlorides of aromatic dicarboxylic acids, particularly of iso-and terephthalic acids.

The present application is an improvement over our copending application S.N. 175,312, filed February 13, 1961. Our earlier process teaches the production of half ester acyl chlorides of aromatic dicarboxylic acids and their nuclear-substituted derivatives, particularly of iso- and terephthalic acid, by heating the trichloromethylbenzoic acid esters of primary aliphatic alcohols, preferably those having up to 5 carbon atoms and particularly the methyl esters, with equimolecular amounts of the corresponding methyl benzoic acids. This reaction is carried out in the presence of small amounts of an acid catalyst such as iron (III) chloride, preferably in amounts of about 0.1% at higher temperatures, particularly 100–160° C. and preferably 120 to 130° C. Subsequently, the resulting mixture of dicarboxylic acid half ester acyl chloride and methyl benzoic acid chloride is separated by distillation.

It has now been found that the half ester acyl chlorides of benzene dicarboxylic acids which may, if desired, be halogen-substituted, particularly of iso- and terephthalic acid, may be prepared particularly advantageously by heating the trichloromethylbenzoic acid esters of primary saturated aliphatic alcohols having up to 5 carbon atoms, preferably the methyl esters, with equimolecular amounts of the corresponding benzene dicarboxylic acid monoesters in the presence of coordinately unsaturated inorganic polyhalogen compounds as catalysts in amounts of from 0.01 to 1.00% by weight. The preferred catalyst is iron (III) chloride or antimony (V) chloride. The reaction is carried out at higher temperatures, particularly 50 to 160° C. and preferably 100 to 130° C.

Two moles of the benzene dicarboxylic acid half ester acyl chloride to be prepared according to the present invention are formed during the reaction, with the cleavage of 1 mole of hydrogen chloride, in an almost quantitative yield from one mole of the trichloromethylbenzoic acid ester and one mole of the benzene dicarboxylic acid monoester. Since essentially no by-products are formed, the half ester acyl chloride may be employed immediately for further treatment in many cases where no particular requirements are manifested as to color and purity. However, the half ester acyl chloride may easily be obtained in a completely colorless and pure condition by a relatively simple distillation.

The trichloromethylbenzoic acid esters required as starting material for the reaction in accordance with the present invention are produced particularly advantageously from m- or p-toluic acid methyl esters, or their halogen-substitution products, by chlorination under exposure to light at temperatures above 150° C. to produce the trichloromethylbenzoyl chlorides, which may be further reacted at once with alcohol to form the esters.

According to the present invention, esters of primary saturated aliphatic alcohols are used as the trichloromethylbenzoic acid esters, for example, methyl-, ethyl-, propyl-, butyl-, and amyl-esters. The methyl esters are preferably used since they react with the greatest speed of reaction and in the most complete manner.

As catalysts, in addition to iron (III) chloride and antimony (V) chloride, zinc chloride, aluminum chloride and boron fluoride, for example, may be used. These substances are designated as acid-analogous substances, for example, according to the "Lehrbuch der Organischen Chemie" by Klages, volume 2, second edition, page 124, and may be defined as cordinately unsaturated, inorganic polyhalogen compounds.

During the reaction according to the present invention, the half ester acyl chloride is formed within a short time with the cleavage of hydrogen chloride. The reaction is generally completed after 1 to 2 hours. The end of the reaction may be recognized by the cessation of hydrogen chloride formation.

The benzene dicarboxylic acid half ester acyl chlorides are valuable intermediate products for the production of synthetic materials by polycondensation.

It is an object of the present invention, therefore, to provide an improved process for the production of half ester acyl chlorides of benzene dicarboxylic acids, particularly of isophthalic acid and terephthalic acid.

This and other objects will become obvious from the following further description wherein the examples serve to illustrate the process without, however, limiting the same.

*Example I*

253.5 parts by weight of p-trichloromethylbenzoic acid methyl ester and 180 parts by weight of terephthalic acid monomethyl ester are heated to 120° C., while stirring, with the addition of 0.4 part by weight of iron (III) chloride. A brisk hydrogen chloride cleavage starts at about 100° C. After heating for two hours to 120–130° C., a clear brown solution is formed, and the reaction mixture no longer evolves hydrogen chloride, even when the temperature is increased to 150° C. By distilling in vacuo, 363 parts by weight of terephthalic acid methyl ester chloride having a melting point of 54° C. are obtained at 15 torr at the boiling point of 140–140.5° C.

*Example II*

253.5 parts by weight of m-trichloromethylbenzoic acid methyl ester and 180 parts by weight of isophthalic acid monomethyl ester are heated to 120–130° C. for one hour with the addition of 0.4 part by weight of antimony pentachloride. A brisk hydrogen chloride formation starts at about 70° C. After completion of the reaction, 372 parts by weight of isophthalic acid methyl ester chloride are obtained by distillation in vacuo at 12 torr at the boiling point of 144–146° C.

*Example III*

288 parts by weight of 4-chloro-3-trichloromethylbenzoic acid methyl ester are heated for one hour to 120–130° C. with 214.5 parts by weight of 4-chloroisophthalic acid monomethyl ester with the addition of 0.4 part by weight of antimony pentachloride. A brisk hydrogen chloride formation commences at 80° C. and upon termination thereof the reaction mixture is distilled in vacuo. At 18 torr, 205 parts by weight of 3,4-dichloroisophthalic acid methyl ester are distilled at 178–180° C., corresponding to a yield of 88% of the theoretical yield.

Since certain changes may be made in carrying out the above process without departing from the scope of the invention, it is intended that all matter contained in the above description shall be interpreted as illustrative and not in a limiting sense.

Since certain changes may be made in carrying out the above process without departing from the scope of the invention, it is intended that all matter contained in the above description shall be interpreted as illustrative and not in a limiting sense.

We claim:
1. A process for the preparation of half ester acyl chlorides of benzene dicarboxylic acids and the nuclear-chlorine substituted derivatives thereof which comprises reacting approximately equimolecular amounts of (I) an ester selected from the group consisting of trichloromethylbenzoic acid esters of primary saturated aliphatic alcohols of from 1 to 5 carbon atoms and nuclear-chlorine substituted trichloromethylbenzoic acid esters of primary saturated aliphatic alcohols of from 1 to 5 carbon atoms with (2) a corresponding monoester of an organic acid selected from the group consisting of benzene dicarboxylic acids and nuclear-chlorine substituted benzene dicarboxylic acids with a primary saturated aliphatic alcohol of from 1 to 5 carbon atoms at an elevated temperature in the presence of a catalytic amount of a coordinately unsaturated inorganic polyhalogen compound.

2. The process of claim 1, wherein said inorganic polyhalogen compound is utilized in an amount of from 0.01 to 1.00% by weight.

3. The process of claim 1, wherein both the trichloromethylbenzoic acid ester and the monoester are the methyl ester.

4. The process of claim 1, wherein said inorganic polyhalogen compound is selected from the group consisting of iron (III) chloride, antimony (V) chloride, zinc chloride, aluminum chloride, and boron fluoride.

5. A process for the preparation of half ester acyl chlorides of benzene dicarboxylic acids and the nuclear-chlorine substituted derivatives thereof which comprises reacting an ester selected from the group consisting of trichloromethylbenzoic acid esters of primary saturated aliphatic alcohols of from 1 to 5 carbon atoms and nuclear-chlorine substituted trichloromethylbenzoic acid esters of primary saturated aliphatic alcohols of from 1 to 5 carbon atoms with an approximately equimolecular amount of a corresponding monoester of an organic acid selected from the group consisting of benzene dicarboxylic acids and nuclear-chlorine substituted benzene dicarboxylic acids with a primary saturated aliphatic alcohol of from 1 to 5 carbon atoms at a temperature of from about 50° to about 160° C. in the presence of from 0.01 to 1.00% by weight of a coordinately unsaturated inorganic polyhalogen compound.

6. The process of claim 5, wherein both the trichloromethylbenzoic acid ester and the monoester are the methyl ester.

7. The process of claim 5, wherein said inorganic polyhalogen compound is selected from the group consisting of iron (III) chloride, antimony (V) chloride, zinc chloride, aluminum chloride and boron fluoride.

8. The process of claim 5, wherein the resultant half ester acyl chloride is additionally purified by distillation.

9. A process for the preparation of half ester acyl chlorides of benzene dicarboxylic acids and the nuclear-chlorine substituted derivatives thereof which comprises reacting an ester selected from the group consisting of trichloromethylbenzoic acid esters of primary saturated aliphatic alcohols of from 1 to 5 carbon atoms and nuclear chlorine substituted trichloromethylbenzoic acid esters of primary saturated aliphatic alcohols of from 1 to 5 carbon atoms with an approximately equimolecular amount of a corresponding monoester of an organic acid selected from the group consisting of benzene dicarboxylic acids and nuclear-chlorine substituted benzene dicarboxylic acids with a primary saturated aliphatic alcohol of from 1 to 5 carbon atoms at a temperature of from about 100° to about 130° C. in the presence of from 0.01 to 1.00% by weight of a coordinately unsaturated inorganic polyhalogen compound.

References Cited by the Examiner
UNITED STATES PATENTS 1,965,556  7/1934  Mills _____ 260—544
2,525,723  10/1950  Rabjohn _____ 260—544

LORRAINE A. WEINBERGER, *Primary Examiner.*

LEON ZITVER, *Examiner.*

R. E. MASSA, T. L. GALLOWAY, *Assistant Examiners.*